US008639658B1

(12) United States Patent
Kumaresan

(10) Patent No.: US 8,639,658 B1
(45) Date of Patent: Jan. 28, 2014

(54) CACHE MANAGEMENT FOR FILE SYSTEMS SUPPORTING SHARED BLOCKS

(75) Inventor: Balemurughan Kumaresan, East Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 333 days.

(21) Appl. No.: 12/764,866

(22) Filed: Apr. 21, 2010

(51) Int. Cl.
*G06F 17/00* (2006.01)

(52) U.S. Cl.
USPC .......................................... 707/609

(58) Field of Classification Search
USPC ................................. 707/609, 692
See application file for complete search history.

(56) References Cited

U.S. PATENT DOCUMENTS

| | | | | |
|---|---|---|---|---|
| 5,990,810 | A * | 11/1999 | Williams | 707/E17.01 |
| 6,061,770 | A * | 5/2000 | Franklin | 711/162 |
| 6,081,875 | A * | 6/2000 | Clifton et al. | 711/162 |
| 6,212,525 | B1 * | 4/2001 | Guha | 707/747 |
| 7,747,584 | B1 | 6/2010 | Jernigan | |
| 7,921,077 | B2 * | 4/2011 | Ting et al. | 707/610 |
| 8,131,924 | B1 * | 3/2012 | Frandzel et al. | 711/113 |
| 8,180,740 | B1 * | 5/2012 | Stager et al. | 707/692 |
| 8,190,714 | B2 * | 5/2012 | Davidson et al. | 707/999.001 |
| 8,250,043 | B2 * | 8/2012 | Yasa et al. | 707/692 |
| 8,285,687 | B2 * | 10/2012 | Voll et al. | 707/687 |
| 2004/0107225 | A1 * | 6/2004 | Rudoff | 707/204 |
| 2005/0192932 | A1 * | 9/2005 | Kazar et al. | 707/1 |
| 2005/0235109 | A1 | 10/2005 | Ogihara et al. | 711/114 |
| 2005/0246401 | A1 * | 11/2005 | Edwards et al. | 707/205 |
| 2006/0107030 | A1 * | 5/2006 | Biondi et al. | 713/2 |
| 2006/0174063 | A1 * | 8/2006 | Soules et al. | 711/118 |
| 2006/0184587 | A1 * | 8/2006 | Federwisch et al. | 707/200 |
| 2007/0088702 | A1 * | 4/2007 | Fridella et al. | 707/10 |
| 2007/0180206 | A1 * | 8/2007 | Craft et al. | 711/162 |
| 2008/0005141 | A1 * | 1/2008 | Zheng et al. | 707/101 |
| 2008/0222223 | A1 * | 9/2008 | Srinivasan et al. | 707/205 |
| 2008/0243769 | A1 | 10/2008 | Arbour et al. | |
| 2010/0070715 | A1 | 3/2010 | Waltermann | |
| 2010/0250858 | A1 | 9/2010 | Cremelie et al. | |
| 2011/0078112 | A1 * | 3/2011 | Takata et al. | 707/622 |
| 2011/0173426 | A1 * | 7/2011 | Moore et al. | 713/2 |
| 2013/0013908 | A1 * | 1/2013 | Isaacson | 713/2 |

OTHER PUBLICATIONS

Woods, "Coping with an Avalanche (e.g. Boot Storm)", Web Page, Claimed Date of Nov. 12, 2009 (unverified), 2 pages, published at http://blogs.netapp.com/insights/2009/11/coping-with-an-avalanche-eg-boot-storm.html.

(Continued)

*Primary Examiner* — Wilson Lee
*Assistant Examiner* — Tiffany Thuy Bui
(74) *Attorney, Agent, or Firm* — Meyertons, Hood, Kivlin, Kowert & Goetzel, P.C.

(57) ABSTRACT

Techniques relating to data deduplication at the file system level are disclosed. A system may include a block cache configured to store data blocks indicated as being shared by multiple files. The system may be coupled to a storage configured to permanently store data for the multiple files. The computer system may receive a file request, and, upon determining that the file request includes shared data, the computer system may service the request wholly or in part using the block cache. When multiple requests including multiple file identifiers (but referring to the same underlying shared data) are received, a shared (common) file identifier may be used in looking up data for the multiple requests, reducing block cache storage, and improving block cache performance and overall system operation.

17 Claims, 10 Drawing Sheets

(56) References Cited

OTHER PUBLICATIONS

Unknown, "Workload Considerations for Virtual Desktop Reference Architectures", Web Page, date unknown (2010 copyright listed), 11 pages, published at http://www.vmware.com/files/pdf/VMware-WP-WorkloadConsiderations-WP-EN.pdf.

Richardson, "Dedup for Speed! Higher Performance Through Deduplication", The Drop Zone Blog, Claimed Date of Jun. 2, 2009 (unverified), 4 pages, published at http://blogs.netapp.com/dropzone/2009/06/dedup-for-speed-higher-performance-through-deduplication.html.

* cited by examiner

Block
Cache 160

| File Identifier 610 | Data Location 620 | |
|---|---|---|
| Sample-File | Vol. 1; Block 1024 | ← Corresponds to information in 635A |
| Test-File | Vol. 2; Block 10200 | ← Corresponds to information in 645B |
| VFile2 | Vol. 2; Block 512 | ← Corresponds to information in 635B and 645A |
| . . . | . . . | |

Sample-File Block Map Information 635

635A. file offset=0, device=vol1, blk#1024, size=1MB, is-extent-shared=NO
635B. file offset=1MB, device=vol2, blk#512, size=1MB, is-extent-shared=YES
635C. file offset=2MB, device=vol3, blk#20480, size=1MB, is-extent-shared=NO Test-File Block Map Information 645

645A. file offset=0, device= vol2, blk#512, size=1MB, is-extent-shared=YES
645B. file offset=1MB, device=vol2, blk#10200, size=3MB, is-extent-shared=NO

*FIG. 6*

CACHE MANAGEMENT FOR FILE SYSTEMS SUPPORTING SHARED BLOCKS

BACKGROUND

1. Technical Field

This disclosure relates generally to data storage systems and, more specifically, to cache management involving shared (e.g., deduplicated) data blocks.

2. Description of the Related Art

Stored data may be organized into data blocks, which in turn may be organized into files. Files in a file system may have no overlap, partial overlap, or total overlap. For example, some files have completely different contents from one another. On the other end of the spectrum, a first file may be a copy of a second file but have a different name (these two files have total overlap of contents). Although the first and second file may have different identities (e.g., /usr/file1 and /temp/file2), the contents referred to are ultimately the same. Files may also have partial overlap in contents.

A file system (or operating system) running on a computer may receive requests to access files. The file system or operating system may then access a storage device containing data for the files. The storage device will necessarily have a limited capacity to handle requests.

A first request for a data block that is shared may cause a request to be sent from a computer system to a storage device. Subsequently, another request to access that same shared data block (perhaps through a different file name) might also trigger a request to be sent from the computer system to the storage device. When a shared data block is requested multiple times (e.g., under different identities), multiple requests to storage devices may result. In some systems, thousands or even millions of requests for the same data being may be sent to a storage device within a relatively short time period, thus burdening the capacity of the storage device.

SUMMARY

In one embodiment, a computer-readable storage medium is disclosed having program instructions stored thereon that are executable by a computer system to perform operations including an operating system of the computer system maintaining a cache configured to store data blocks shared within a file system, the operating system receiving a first request to access one or more data blocks of a first file in the file system, wherein the first request includes a first file identifier for the first file, the operating system accessing deduplication information to determine whether at least a first one of the one or more data blocks is shared within the file system, the operating system determining a shared file identifier for the at least a first data block of the first file based on the accessed deduplication information, the operating system accessing the cache using the shared file identifier, and the operating system servicing the first request.

In some embodiments, the operations include the computer system receiving a second request to access one or more second data blocks of a second file in the file system, wherein the second request includes a second file identifier for the second file, the operating system determining accessing the deduplication information to determine whether at least a first one of the one or more second data blocks is shared within the file system, the operating system determining, based on the accessed deduplication information, that the shared file identifier also identifies the at least a first one of the second data blocks of the second file based on the accessed deduplication information, and the operating system servicing the second request, including reading at least one data block from the cache using the shared file identifier.

In some embodiments, said servicing the first request includes retrieving the one or more data blocks of the first file from the cache, and said servicing the first request does not include the computer system accessing a storage array configured to store data blocks of the file system, wherein the storage array is indicated as storing the one or more data blocks of the first file.

In some embodiments, the file system is a clustered file system, and the computer system is one of a plurality of servers storing instructions configured to manage the clustered file system.

In some embodiments, the operations include the operating system maintaining one or more volume files, wherein said shared identifier specifies one of the one or more volume files. In some embodiments, each of the one or more volume files corresponds to a respective storage volume in a storage array configured to store data blocks for the file system. In some embodiments, the operations include in response to a first indication that a data block is no longer shared by two or more files, the operating system invalidating one or more entries in the cache using the shared identifier, and in response to a second indication that a data block is now shared by two or more files, the operating system altering one or more entries in the cache to include the shared identifier.

In some embodiments, the cache is configured to store data blocks that are not shared within the file system In some embodiments, said maintaining the cache includes the operating system dynamically adjusting an amount of memory of the computer system allocated to the cache.

In some embodiments, the first file identifier is different from the shared file identifier.

In one embodiment, a method includes a computer system receiving a file access request specifying a first file identifier, wherein the computer system includes a processor and a memory, the computer system accessing deduplication information to determine that at least a portion of the first file is shared, the computer system determining a shared file identifier for the file access request based on the deduplication information, and the computer system servicing the file access request, including accessing a cache maintained by an operating system of the computer system, wherein the cache is configured to store file portions, and wherein said accessing includes using the shared file identifier.

In some embodiments, the computer system is a networked file server, and a file system including the first file is a clustered file system.

In some embodiments, the method further comprises upon determining that the cache includes at least one file portion needed to service the file access request but does not include at least one or more other file portions needed to service the file access request, the computer system retrieving the one or more other file portions from one or more storage devices coupled to the computer system, wherein the cache is implemented in a memory of the computer system other than the one or more storage devices.

In some embodiments, the at least one file portion is shared, at least one or more other file portions are not shared, and said retrieving the one or more other file portions includes using the first file identifier.

In some embodiments, said servicing the file access request includes providing one or more shared file portions to a first user, and the method further comprises providing the one or more shared file portions to a plurality of other users in response to a plurality of other file access requests, wherein individual ones of the other file access requests specify file identifiers other than the first file identifier.

In one embodiment, a clustered file system is described, comprising a plurality of computer servers configured to service file requests and a plurality of storage devices coupled to the plurality of computer servers via one or more interfaces, wherein the plurality of storage devices are configured to store files of the clustered file system. Individual ones of the plurality of computer servers may respectively include caches configured to store data blocks, and for a given file access request specifying a given file identity, individual ones of the plurality of computer servers are configured to service the given file access request by: accessing deduplication information to determine whether at least a first data block needed to satisfy the given file access request is shared, determining a shared file identifier for the at least a first data block based on the accessed deduplication information, and servicing the given file access request using the shared file identifier.

In some embodiments, said servicing the given file access request includes one or more of the plurality of computer servers using at least one of the caches to provide the at least a first data block without accessing a copy of the at least a first data block stored in the plurality of storage devices.

In some embodiments, the plurality of storage devices and the one or more interfaces comprise a storage area network (SAN).

In some embodiments, individual ones of the plurality of computer servers are configured to detect that a given data block is no longer shared, and in response, to invalidate a cache entry for the given data block.

In some embodiments, the clustered file system includes stored instructions executable to run a deduplication process that generates the deduplication information.

BRIEF DESCRIPTION OF THE DRAWINGS

FIG. 6 is a block diagram illustrating an embodiment of a block cache used with a volume file.

DETAILED DESCRIPTION

Figure 1:
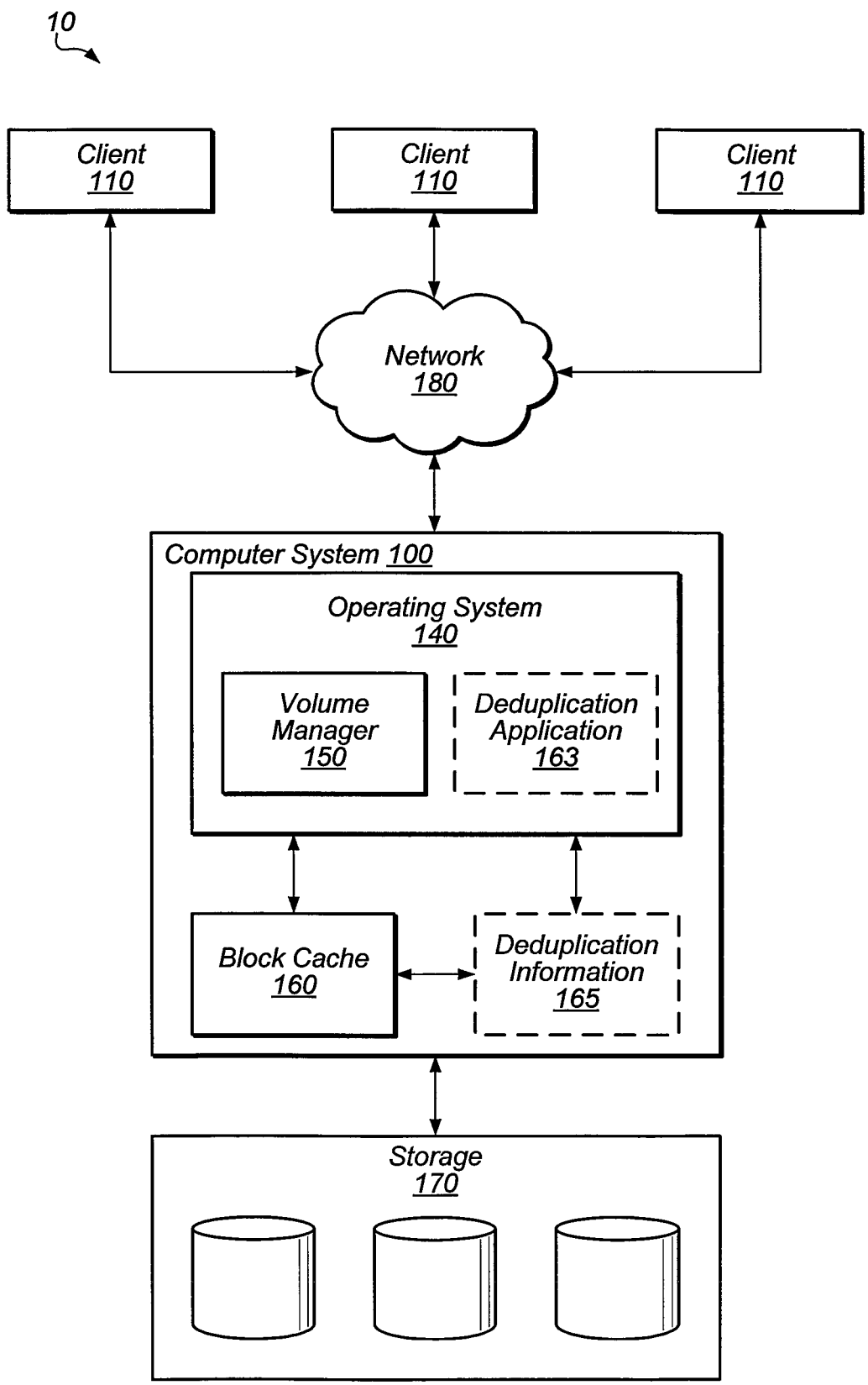
FIG. 1 is a block diagram illustrating an embodiment of a computer system usable to run file system software.

In an environment where, for example, virtual machine images are hosted, file snapshots and file deduplication at the sub-file level (e.g., data block level) may provide storage savings. The ratio of identical data content achieved between different virtual machine boot images is very high, as most of the content in a boot image (e.g., a vmdk file) is shared by other boot images, and typical customization is less than 10% between different user customized images of the same operating system environment. A page in an operating system page cache (or "block cache") may have its identity (e.g., file handle or other reference used by some portion of the operating system or other program) determined by information referencing the file (e.g., a reference to a file system node such as a vnode in one embodiment) and/or a file offset (logical offset into the file).

Where multiple files share the same blocks, accessing those shared blocks via different file identifies may result in (1) duplicate I/O requests, such as multiple I/O requests to a storage unit (e.g., a volume, LUN, and/or disk) each time a shared block is accessed via a different file; and (2) duplicate content in the page cache, since each file that accesses a shared block may have its own read-only copy of the shared block stored in the page cache, even though the content of the shared block may already be cached under the identity of another file that shares the same block. One of the problems created by this behavior of modern page cache-based file systems is widely known as a "boot storm." A boot storm may occur when multiple virtual machine images are being hosted on the same file system and large numbers of the virtual machines are booted at the same time. The duplicate I/O requests and duplicate content in page cache is also an issue for environments in which file system checkpoints are used—for example, when two or more application instances are running on different checkpoints of the same file system image and thus are accessing common data. Solutions to these problems are described herein. These solutions may reduce storage costs, and may also improve system performance by reducing block cache load.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"First," "Second," etc. These terms indicate labels and do not necessarily imply a ordering (e.g., temporal) between elements. For example, a reference to a "first" data block and a "second" block of a file refer to any two different blocks within the file, not necessarily an initial block and a block that follows the initial block according to some ordering.

"Portion." This term is open-ended, and includes any amount or logical division, up to and/or including an entire whole, of whatever thing is being referred to.

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"Computer" or "Computer System." This term has its ordinary and accepted meaning in the art, and includes one or more computing devices operating together and any software stored thereon. A computing device includes one or more processor units and a memory subsystem. A memory subsystem may store program instructions executable by the one or more processor units.

"Computer-readable medium." As used herein, this term refers to a non-transitory (tangible) medium that is readable by a computer or computer system, and includes magnetic, optical, and solid-state storage media such as hard drives, optical disks, DVDs, volatile or nonvolatile RAM devices, holographic storage, programmable memory, etc. This term specifically does not include transitory (intangible) media (e.g., a carrier wave).

"Operating System." This term has its ordinary and accepted meaning in the art, and includes a program or set of program that control access to resources of a computer system (e.g., in response to requests from applications). In one embodiment, an operating system controls access to I/O devices such as communication devices, storage devices, etc. An operating system may, in certain embodiments, be executable to implement a file system and/or a volume manager.

"Cache." This term has its ordinary and accepted meaning in the art, and includes memory that stores data and improves future requests for such data by providing faster access relative to some other memory.

"File." This term has its ordinary and accepted meaning in the art, and includes an organization of data that includes one or more data blocks. Management of files is typically governed by a file system.

"File System." This term has its ordinary and accepted meaning in the art, and includes a method of storing and organizing computer files. In some embodiments, a file system can be considered a special-purpose database for the storage, organization, manipulation, and retrieval of data and metadata about files. A file system may be executable by a computer system to allow access to and manipulation of files. Metadata stored by a file system may include the number and locations of data blocks in a file, and whether some, all, or particular ones of those data blocks are shared. Veritas File System (VxFS) is an example of a file system.

"Clustered File System." This term has its ordinary and accepted meaning in the art, and includes a file system which is simultaneously mounted on multiple servers and allows simultaneous update and access by multiple nodes, while maintaining the correctness, consistency, and cache coherency of the data in the file system. Veritas Cluster File System (VxCFS) is an example of a clustered file system. The term "clustered file system"

"Data Block." This term has its ordinary and accepted meaning in the art, and includes a basic unit of data within a physical storage volume, and/or a basic unit of data within logical storage such as a file system or memory system (e.g., the minimum unit of data that may be accessed by a disk). In some embodiments, a cache storing data blocks may be referred to as a block cache (also referred to as a "page" cache). Data blocks within a same physical storage volume typically have the same (fixed) size. Data blocks within a same file system also typically have the same size. A file system data block size may differ from a physical storage data block size in some embodiments. A data block may store different types of content, such as file system metadata and/or user data.

"Extent." This term has its ordinary and accepted meaning in the art, and includes one or more contiguous data blocks (e.g., consecutively located on disk). Different extents may of course be variable in size.

"Shared Data Block" and/or "Shared File Portion." These terms have their ordinary and accepted meanings in the art, and include a data block having data identified (e.g., by some program such as a deduplication application or other program entity) as being shared by two or more different files. A shared data block may also refer to a data block that is shared within the same file—for example, if a same file has a first portion and a second portion respectively located in different regions of the same file, with the portions having identical content, then a single shared data block may be used to store the identical content for the first and second portions. A data block that has two or more file system references to it may be considered shared, while that same data block may become unshared if the number of references to it is decremented to one. The number of references to a data block may be incremented and decremented depending on file system activity over time.

"Unshared Data Block" and/or "Unshared File Portion." These terms have their ordinary and accepted meanings in the art, and include a data block that has not been identified as being shared by one or more files.

"Storage Volume." This term has its ordinary and accepted meaning in the art, and includes a division or portion of a file system. A storage volume may include a physical volume of data, such as a physical hard disk, or a logical volume that is distributed across one or more physical devices.

"Causing a Computer System to Perform Operations." The execution of program instructions may be described or claimed as "causing a computer system to perform operations." The phrase is to be interpreted broadly, covering instructions that, when executed, perform the operations in questions, as well as instructions that install or instantiate code that, when executed, performs the operations.

Turning now to FIG. 1, an illustration 10 including an embodiment of a computer system 100 is depicted. The present disclosure describes various embodiments of one or more computer systems that are configured to efficiently support a storage system having deduplication capabilities. Support for a storage system having deduplication capabilities may be made at the file system level. File system level operations may take place within an operating system kernel.

Deduplication may thus occur at both the storage system level and at the file system level. For more information on data deduplication at the storage system level, see, e.g., U.S. Patent Pub. No. 2008/0243769. Various techniques are available for identifying duplicated information. For example, the file system may identify a copy of a file as a duplicate at the time a copy operation is made. Scanning processes may also identify duplicate content, for example, by scanning every data block in a file system or storage volume and generating a checksum or hash value corresponding to the data block, where identical checksums indicate identical data content between data blocks. These techniques for identifying duplicated content (and others) may be employed by a deduplication application 163 in FIG. 1.

As shown in FIG. 1, computer system 100 includes an operating system 140, volume manager 150, and block cache 160. Computer system 100 may also include deduplication application 163 and deduplication information 165. Computer system 100 may be a network file server in some embodiments, and may be one of a plurality of server systems configured to manage a clustered file system in some embodiments.

Deduplication application 163, operating system 140, and volume manager 150 may be instructions stored on one or more computer readable media of computer system 100, and they may be executed by one or more processors of computer system 100. Deduplication application 163 is executable to generate deduplication information 165, which includes information specifying file portions (e.g., data blocks or extents) that are shared. Deduplication application 163 may be part of operating system 140 in some embodiments but need not be in others. In some embodiments, part or all of deduplication application 163 is stored and/or executed on a different computer system from system 100. Deduplication application 163 may be executed as a distributed application as part of a clustered file system.

One or more clients 110 may send file system requests to computer system 100, which in turn attempts to service the requests. Clients 110 may be able to communicate with computer system 100 via a network 180 in some embodiments, or via a bus or other interface in other embodiments. Servicing client requests may involve reading data from block cache 160 and/or from storage 170. Clients 110 may be any suitable computer or computer system, including computer system 270 described below with reference to FIG. 2C.

Operating system 140 may include volume manager 150 and/or other software suitable to manage a file system. Volume manager 150 need not be included in operating system 140 in all embodiments. Volume manager 150 may receive, handle, and/or service file system requests, and may additionally manage other aspects of data storage. Volume manager 150 is configured to interact with (and/or coordinate interaction and information exchange between) block cache 160, storage 170, deduplication application 163, and/or deduplication information 165.

Block cache 160 is a cache implemented in a memory of computer system 100, and is configured to store portions of files (e.g., data blocks or extents) that are shared. For example, a given data block stored within block cache 160 may include data that is present within two or more different files, or data that is present at multiple locations within a same file, or any combination or variation thereof. Block cache 160 may be configured to interact with deduplication information 165, and in some embodiments, block cache 160 may be configured to store all or a portion of deduplication information 165. Block cache 160 may be part of operating system 140 in some embodiments. Block cache 160 may also be configured to store unshared data blocks as well as shared data blocks—for example, in one embodiment, block cache 160 simply functions as a cache for disk accesses by the operating system, and does not discriminate between shared or unshared data blocks.

Block cache 160 is further configured to receive and store file portions that are stored in storage 170. For example, a client 110 may make a request to computer system 100 for a portion of a first file, the contents of which are stored on one or more storage volumes of storage 170. Volume manager 150 may cause the portion of the first file to be retrieved from storage 170. Upon retrieval, volume manager 150 may cause the retrieved portion to be stored in block cache 160. As noted, block cache 160 may be configured to store only shared file portions in some embodiments, while in other embodiments block cache 160 may also be configured to store file portions that are unshared.

Storage 170 may be a disk array such as a RAID array, or any other arrangement of one or more storage devices. Storage devices within storage 170 may interconnect via one or more buses and/or one or more networks. Storage 170 may include one or more separate caches (not depicted), which may be at the array cache level and/or the disk cache level. Storage 170 may include magnetic or other storage medium types that may be at least an order of magnitude slower to access, on average, than block cache 160 (particularly with respect to access by computer system 100). Thus, in some embodiments, while it might take computer system 100 a few microseconds ($10^{\sim -6}$) to access block cache 160, it may take a few milliseconds ($10^{\sim -3}$) to access storage 170. In some embodiments, a storage area network (SAN) may comprise combinations of computer system 100, storage 170, and/or network 180. Such a SAN may include the SAN of FIG. 2B, for example.

Figure 2A:
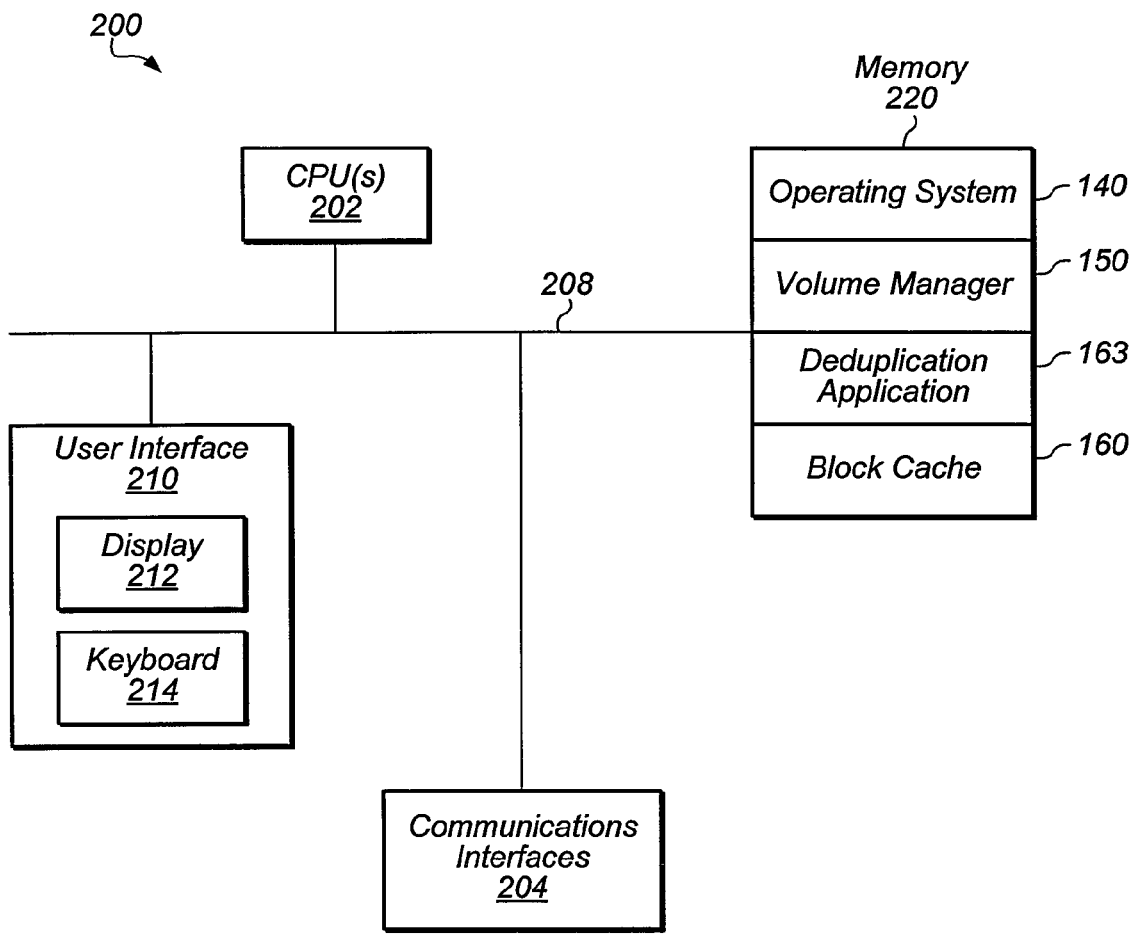
FIG. 2A is a block diagram illustrating one embodiment of computer system 100 shown in FIG. 1.

Turning now to FIG. 2A, an illustration 200 of an embodiment of computer system 100 is shown. Any and all portions of computer system 200 may be present in various embodiments of computer system 100 of FIG. 1. As shown, in this embodiment, computer system 100 includes one or more processing units (CPUs) 202, one or more network or other communications interfaces 204, memory 220, and one or more communication buses 208 for interconnecting these components. Computer system 100 may include various user interface devices 210, for instance a display 212, a keyboard 214, etc.

Memory 220 may be considered to include any suitable type of memory within computer system 100. Memory 220 may include volatile memory (e.g., memory that is in use during operation of computer 110) and/or non-volatile memory. Thus, memory 220 may include RAM, ROM, magnetic storage, any other suitable computer readable medium as that term is used herein, and any combination thereof. As shown, memory 220 may store various software modules and/or collections of data. Memory 220 may store operating system 140, volume manager 150, a deduplication application 230, and cache 160.

Figure 2B:
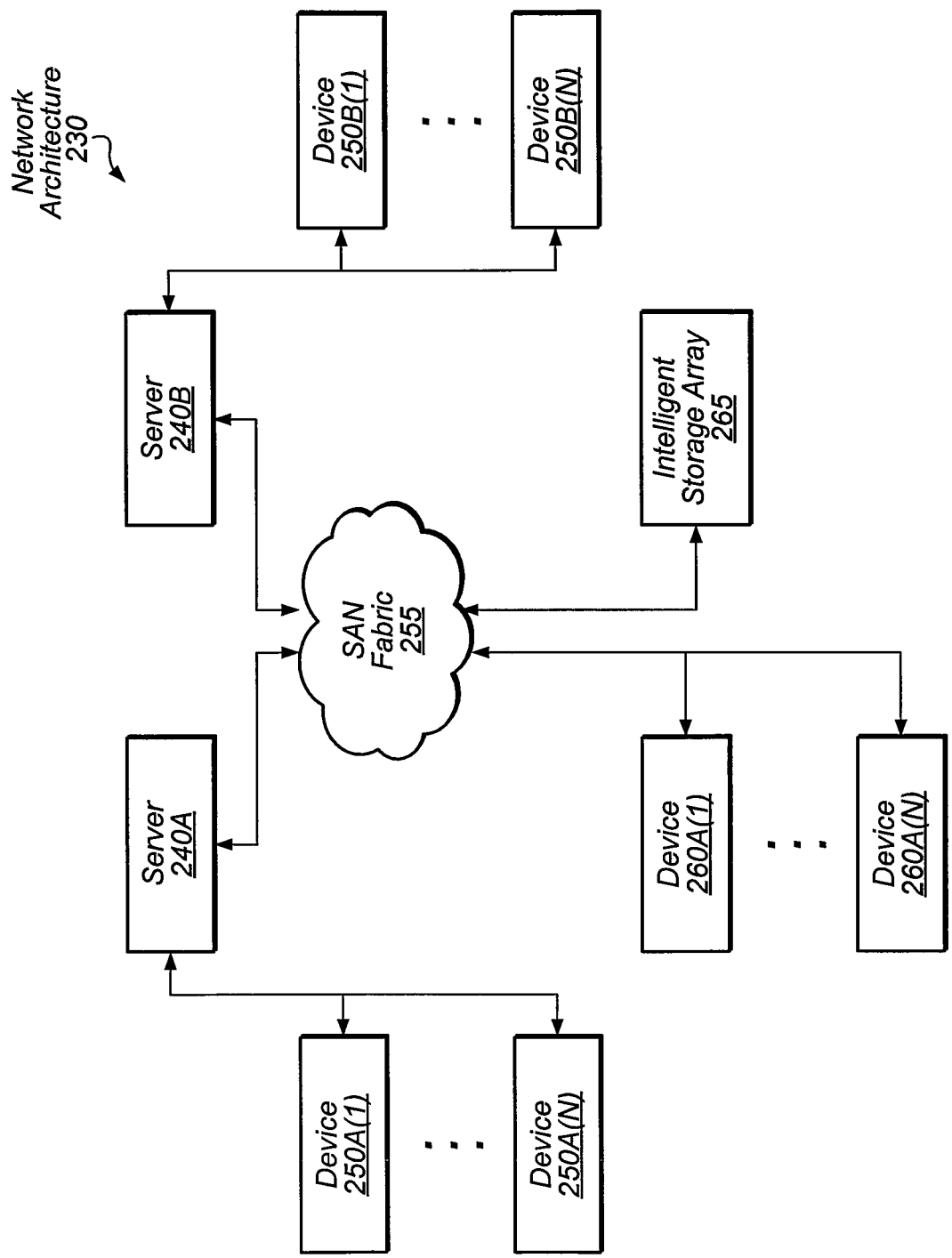
FIG. 2B is a block diagram illustrating one embodiment of a storage area network.

FIG. 2B is a block diagram depicting one embodiment of a network architecture 230 for implementing a storage area network. In one embodiment, various blocks such as storage servers 240A and 240B can be implemented using computer systems similar to computer system 100 discussed above and/or computer system 270 discussed below Storage server 240A is depicted as having storage devices 250A(1)-(N) directly attached, and storage server 240B is depicted with storage devices 250B(1)-(N) directly attached. Storage servers 240A and 240B are also connected to a SAN fabric 255, although connection to a storage area network is not required in all embodiments. In some embodiments, various other types of networks, such as Ethernet networks may be used in place of SAN fabric 255. In one embodiment, SAN fabric 255 supports access to storage devices 260(1)-(N) by storage servers 240A and 240B (which may represent computer system(s) 100 in some embodiments). Intelligent storage array 265 is also shown as an example of a specific storage device accessible via SAN fabric 255. In various embodiments, various components or network architecture 230 may be implemented as part of a cloud computing platform. As noted above, computer system 100, storage 170, and network 180 may be included within a SAN in one embodiment.

Figure 2C:
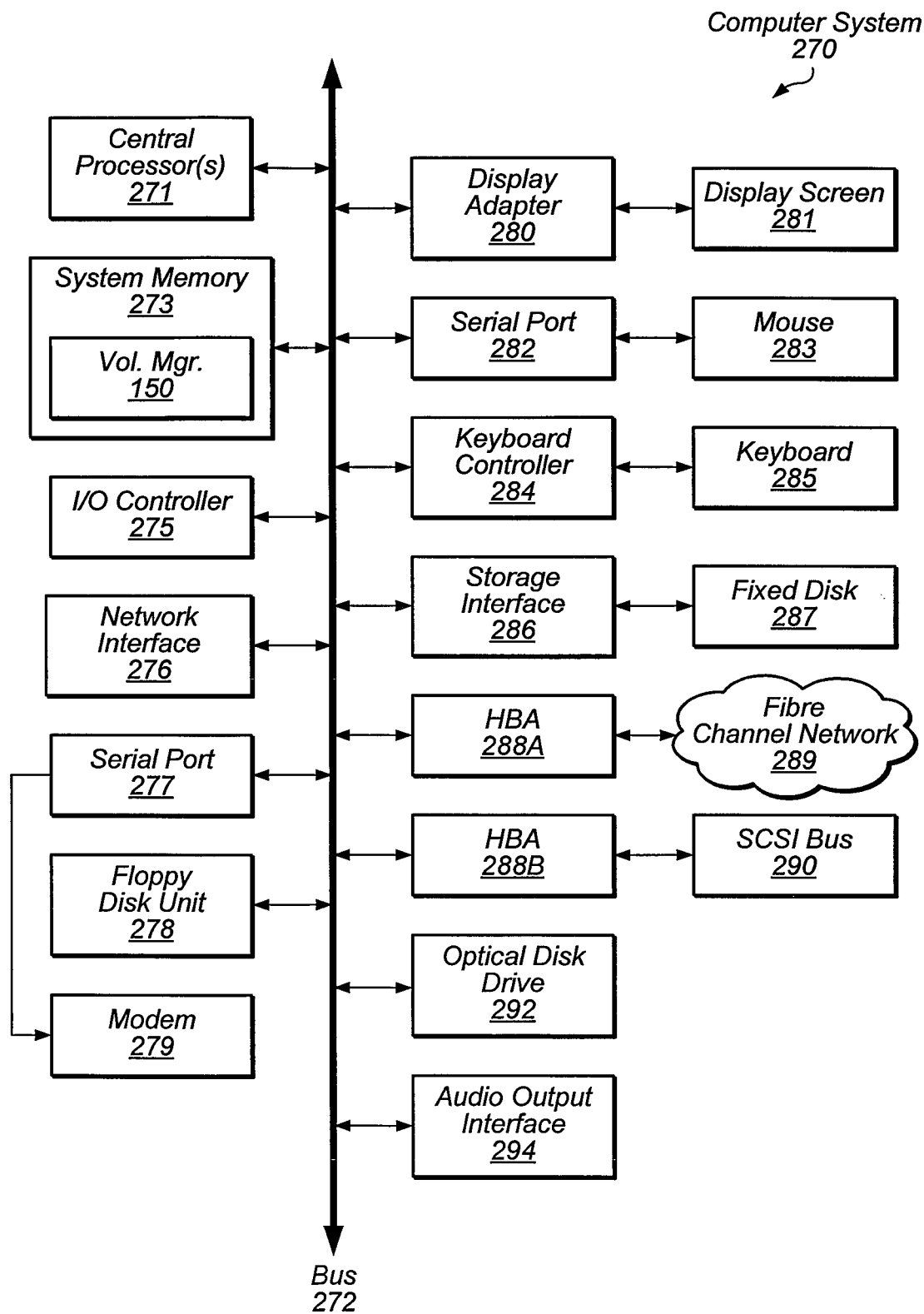
FIG. 2C is a block diagram illustrating one embodiment of a representative computer system for implementing a client computer.

Turning now to FIG. 2C, a block diagram of one embodiment of a computer system 270 used to implement client computer 110. Components depicted in computer system 270 may be present in some embodiments of computer system 100, however. Computer system 270 includes a bus 272 which interconnects major subsystems of computer system 270, such as a central processor 271, a system memory 273

(typically RAM, but which may also include ROM, flash RAM, or the like), an input/output controller 275, an external audio device, such as a speaker system via an audio output interface 294, an external device, such as a display screen 281 via display adapter 280, serial ports 282 and 277, a keyboard 285 (interfaced with a keyboard controller 284), a storage interface 286, a floppy disk drive 278 operative to receive a floppy disk, a host bus adapter (HBA) interface card 288A operative to connect with a Fibre Channel network 289, a host bus adapter (HBA) interface card 288B operative to connect to a SCSI bus 290, and an optical disk drive 292 operative to receive an optical disk. Also included are a mouse 283 (or other point-and-click device, coupled to bus 272 via serial port 282), a modem 279 (coupled to bus 272 via serial port 277), and a network interface 276 (coupled directly to bus 272).

Bus 272 allows data communication between central processor 271 and system memory 273, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 270 are generally stored on and accessed via a computer readable medium, such as a hard disk drive (e.g., fixed disk 287), an optical drive (e.g., optical drive 292), a floppy disk unit 278, or other storage medium. Additionally, applications can be in the form of electronic signals modulated in accordance with the application and data communication technology when accessed via network modem 279 or interface 276. System memory 273 may comprise program instructions (such as volume manager 150 in some embodiments) to implement various techniques described below.

Storage interface 286, as with the other storage interfaces of computer system 270, can connect to a standard computer readable medium for storage and/or retrieval of information, such as a fixed disk drive 287. Fixed disk drive 287 may be a part of computer system 270 or may be separate and accessed through other interface systems. Modem 279 may provide a direct connection to a remote server via a telephone link or to the Internet via an internet service provider (ISP). Network interface 276 may provide a direct connection to a remote server via a direct network link to the Internet via a POP (point of presence). Network interface 276 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2C need not be present to practice the present disclosure. The devices and subsystems can be interconnected in different ways from that shown in FIG. 2C. The operation of a computer system such as that shown in FIG. 2C is readily known in the art and is not discussed in detail in this application. Code to implement the present disclosure can be stored in computer-readable storage media such as one or more of system memory 273, fixed disk 287, optical disk, or floppy disk. The operating system provided on computer system 270 may be MS-DOS®, MS-WINDOWS®, OS/2®, UNIX®, Linux®, or another known or suitable operating system.

Moreover, regarding any signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
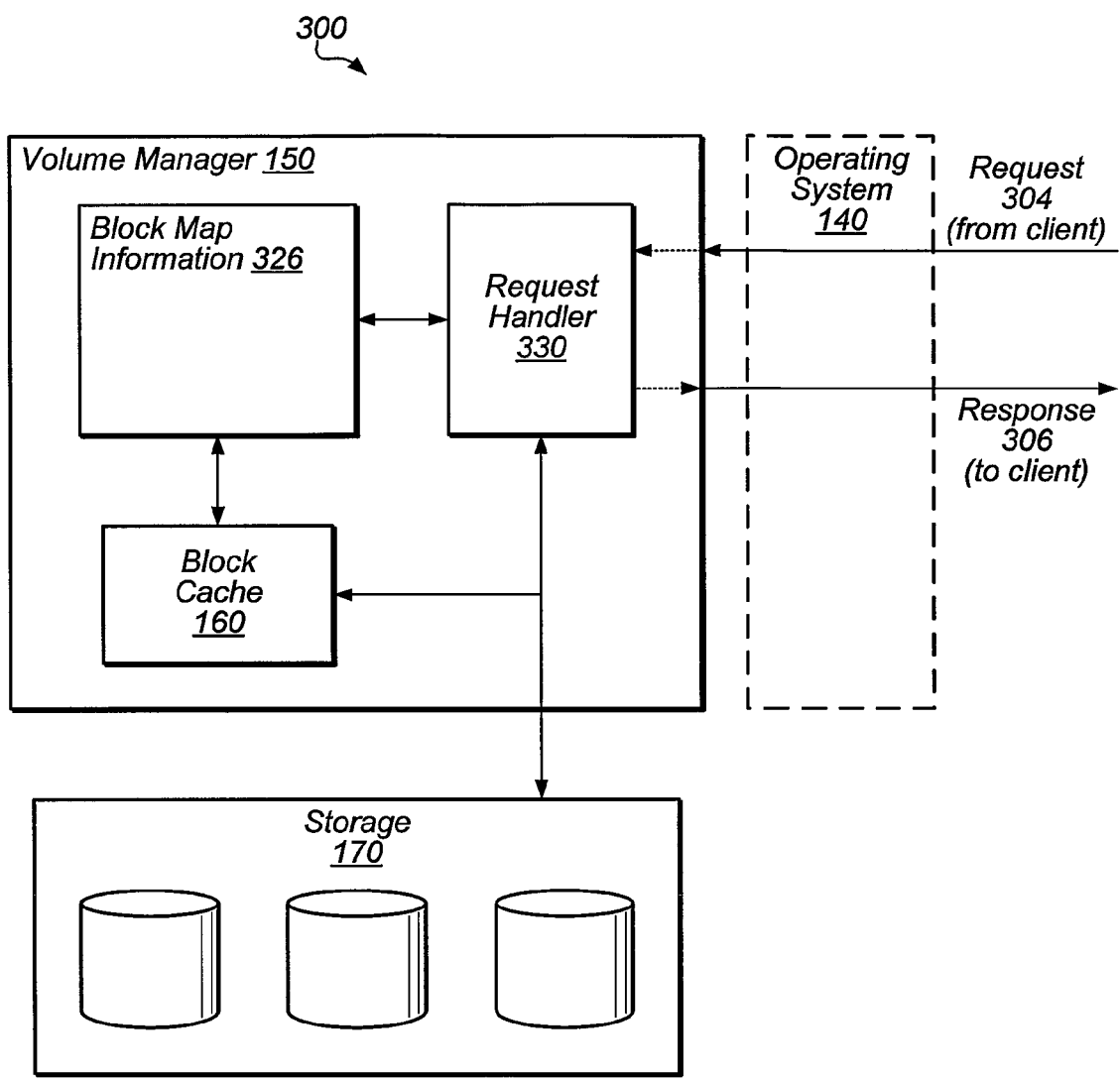
FIG. 3 is a block diagram of another embodiment of computer system 100 of FIG. 1.

Turning now to FIG. 3, another embodiment 300 of computer system 100 is shown. Volume manager 150 (which, in this embodiment, includes block cache 160) may receive a request 304 from a client (such as client 110), where the request is for one or more portions of one or more files. This request may be handled, passed on, or processed in full or in part by operating system 140 (which may also include all or part of volume manager 150 in some embodiments). A request handler 330 within volume manager 150 receives the request and determines how it is to be handled. For example, request handler 330 may determine that a requested file portion is shared, determine a shared file identifier for the requested portion, and attempt to locate the requested file portion in the cache using the shared file identifier. In one embodiment, block map information 326 for the requested file is checked to determine if a requested portion is shared. Each file in a file system may have its own block map information, which may or may not be centrally located (e.g., block map information 326 could appear in numerous locations on disk for a variety of files). In some embodiments, a block map for a regular file in a file system refers to a subset of data blocks in a volume (or a set of volumes). A regular file is visible to users, and may have a block map that spans multiple volumes in a multi-volume file system such as VxFS. As one example, different regions of a file may be stored in different tiers of storage—see also the example provided in FIG. 6.

After request handler 330 determines that a requested file portion is shared, request handler 330 may then use a shared file identifier to query cache 160. The shared identifier may be to a special volume file (e.g., a "Vfile") in some embodiments. Thus, servicing the request and providing the requested data may make use of a file identifier other than the one originally used in the request—and thus in some embodiments volume manager 150 may translate or otherwise convert a first file identifier (or reference) to another, shared file identifier that is usable to locate shared data. See FIG. 6 and accompanying text below for additional information.

If request handler 330 determines the requested portion is not shared, then request handler 330 may seek the requested portion from the block cache 160 under a first identifier (i.e., the identifier specified in the originally made request 304 from the client, rather than a determined shared identifier). Request handler 330 may seek the requested file portions in block cache 160 (regardless of whether the requested file portion is shared) to avoid a possible time consuming request to storage 170. If block cache 160 does not contain the requested portion, however, request handler 330 (and/or other software in volume manager 150) may cause the requested file portion to be retrieved from storage 170. File portions retrieved from storage 170 may then be stored in block cache 160, under either a first file identifier specified in request 304 or under a determined shared identifier.

Note that whether a file portion is shared may not have any bearing on whether that file portion is currently in cache 160. In some embodiments block cache 160 is configured to store both shared and unshared file portions. (In other embodiments, separate block caches could be used, respectively, for shared and unshared file portions, and in yet further embodiments, it is even possible that a block cache for unshared file portions might not be used at all.) Block cache 160 may dynamically vary in size in some embodiments, and may be maintained by an operating system, an operating system kernel, and/or other file system software. Thus as described above, block cache 160 may cache data for storage 170. Block cache 160 may use any kind of cache management policies known by persons of skill in the art, such as least recently used replacement (LRU) for data blocks.

To provide transparency, in some embodiments the response 306 to the client is provided under the first identifier (e.g., file handle) used in (or associated with) the request 304 from the client. Thus, if a client requests to read a file portion from file "/usr/text1," and the requested file portion is indicated as being shared by another file, the client or user may be completely unaware that in servicing the request, block cache 160 is internally queried by the volume manager using a shared identifier for "/usr/text1." In some embodiments, a shared identifier that is internally used may be different than the first identifier specified in request 304, and may be an identifier or reference to a special volume file. See FIG. 6 and accompanying text for more information.

Figure 4:
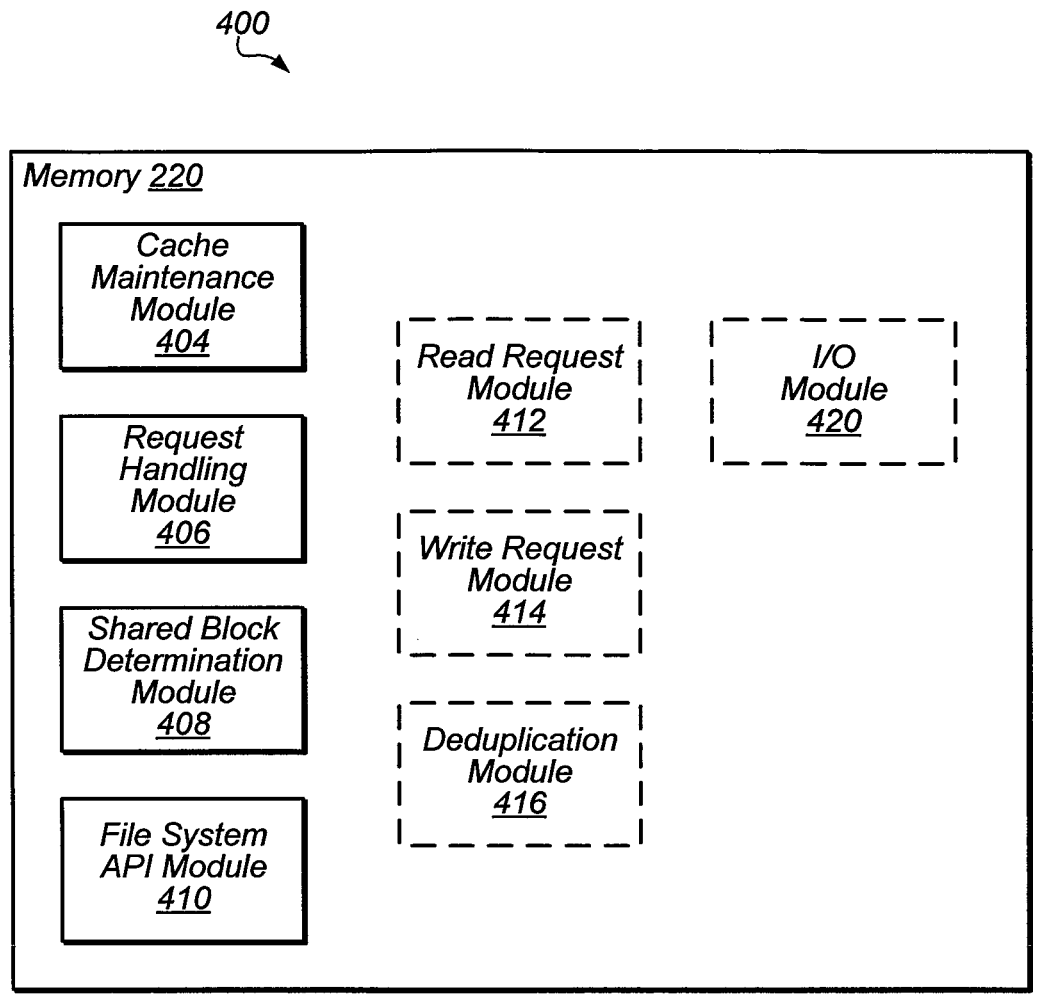
FIG. 4 is a block diagram of one embodiment of memory 220 shown in FIG. 2A.

Turning now to FIG. 4, a block diagram 400 of various modules within memory 220 of computer system 100 is depicted. Memory 220 may be any suitable type of memory, including those described in FIGS. 1 and 2. As shown, memory 220 may wholly or partially comprise volume manager 150, and comprises a variety of software modules. Cache maintenance module 404 may be executable to dynamically adjust an amount of memory allocated to the block cache 160 (e.g., by operating system 140), and may also be executable to dynamically add and/or free (delete) entries in block cache 160. Request handling module 406 may be executable to receive file requests from clients and perform functions described above with respect to request handler 330. Shared block determination module 408 may be executable to determine when a block or an extent is shared (either by another file or within the same file)—this determination may be done using deduplication information 165. File system API module 410 may be executable to provide programming or other interfaces to the file system, and handle various other functionality of the file system. Module 410 may be executable to include handling read and/or write requests using read request module 412 and/or write request module 414. Deduplication module 416 may be executable in conjunction with module 408 to eliminate unneeded space (previously used by a file now known to have data shared with another file) within storage 170 and/or within block cache 160. I/O module 420 may be executable to include drivers or otherwise contain functionality to interact with physical storage.

Figure 5:
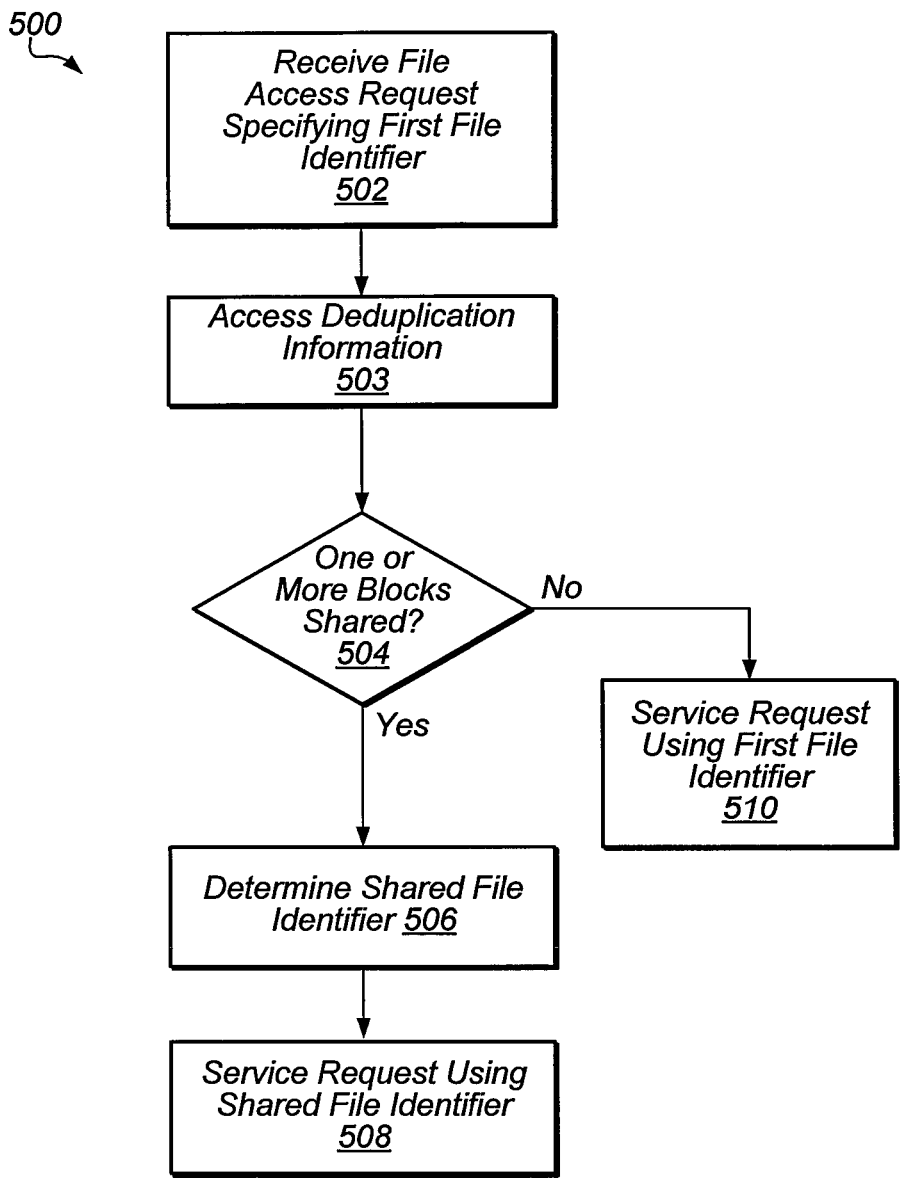
FIG. 5 is a flow diagram illustrating one embodiment of a method for servicing a file access request.

Turning now to FIG. 5, a flow diagram illustrating a method 500 for servicing a file access request is shown. Steps of method 500 may be performed variously by any combination of volume manager 150, and any or all of modules 406-414, and/or module 420. Method 500 is not limited in this regard, however.

In step 502, a file access request is received—e.g., at computer system 100. In the embodiment of FIG. 5, the received request specifies a first file identifier. Next, the computer system accesses deduplication information 165 in step 503. Accessing deduplication information 165 may comprise accessing block map information 326 in some embodiments. Using the accessed deduplication information, in step 504, the computer system determines whether one or more requested blocks in the first file are shared. If no requested data blocks are shared, the request is serviced in step 510 using the first file identifier, which may include querying cache 160 using the first file identifier.

If its determined in step 504 that one or more requested blocks are shared, the method proceeds to step 506. In step 506, the computer system determines a shared file identifier. In some embodiments, this shared file identifier may be a reference or identifier for a special volume file, and may be different from the first identifier. In other embodiments and under certain scenarios, the shared file identifier may be the same as the first file identifier, however. In step 508, the file access request is serviced using the shared file identifier. For example, the shared file identifier may be used to retrieve the requested shared blocks from block cache 160, assuming the requested shared blocks are already stored in the block cache 160. Or, the requested shared blocks may be retrieved from storage 170 using the shared file identifier. Servicing the request may also include servicing some portion of the request using a shared file identifier, while servicing other unshared portions of the file access request may involve a different data lookup in cache 160 or storage 170. Thus, servicing a file access request could in some scenarios involve a combination of steps 508 and 510.

As indicated above, a plurality of requests for a plurality of files having various file identifiers may all result in the same shared file identifier being used to perform a data lookup in cache 160 (or storage 170). By ensuring that a shared identifier is used, unnecessary requests to storage 170 may be avoided, and unnecessary entries in cache 160 (i.e., the same data being stored under different file identifiers) may also be avoided. Note that the first file identifier may refer to at least a portion of a boot image and/or a virtual machine image, or any other kind of file or portion thereof.

Turning now to FIG. 6, an embodiment of a block cache used with a volume file is shown. In the example of FIG. 6, block cache 160 is shown having a field identifier field 610 and a data location 620. Block cache 160 may have other entries and other information (not depicted). Block map information 635 and 645 is shown for two different files that span multiple volumes. Information 635 and 645 may be part of block map information 326. In this example, a single file system may have three volumes: Vol. 1 (100 GB), Vol. 2 (500 GB) and Vol. 3 (size 2TB). A regular file in this file system (named "Sample-File") may have a size of 3 MB, and share data at offset 1 MB-2 MB with another file. Yet another regular file ("Test-File") may share data with sample-file at an offset of 0 MB-1 MB. The block maps for these and other files may in some embodiments include information such as (i) a device number for an extent (or file portion; (ii) a starting block number for the extent; (iii) a number of blocks in the extent; and (iv) whether the extent is shared.

When a client request 304 is made for Sample-File, volume manager 150 may consult block map information 635. If the request is to Sample-File at file offset 0, volume manager 150 in this embodiment will determine that this file portion (or extent) is not shared, service the request by querying cache 160 using a file identifier of "Sample-File." Likewise, if a client request is made for "Test-File" at file offset 1 MB, the cache 160 will be queried using a file identifier of "Test-File,"

because block map information 645 indicates that file extent is not shared. These cache queries are transparent to the user.

If a client request 304 is made for Sample-File at file offset 1 MB, volume manager 150 will determine, using block map information 635, that this requested file portion is shared. Instead of querying the block cache 160 using the file identifier of "Sample-File," a shared file identifier is determined. In this embodiment, a special volume file ("Vfile") is used as the shared file identifier.

In some embodiments, a special volume file exists for each volume in a file system. The volume file may be used as a shared file identifier for all references (file identifiers) to shared data on that volume. Thus, all requests made to any shared extents for a particular volume may be internally cached by at the file system level using the same shared identifier, such as an identifier to the volume file for the particular volume. The volume file may not be a "regular" file, but may be indicated as a read-only file that spans an entire storage volume. Thus, in some embodiments the block map information for a volume file will not change (unless the volume size itself is altered, for example), and a write request using the volume file identifier cannot be properly made and/or serviced. In FIG. 6, the volume file for Vol. 2 uses an identifier of "Vfile2," and in the above manner, a volume file identifier may be easily implemented as a shared identifier at the file system level for shared data, thus allowing deduplication to be effective within block cache 160.

In some embodiments, a volume file is created and/or accessed by an operating system (or an operating system kernel), and thus may not be directly accessible by users, or applications running on a client 110 and/or the computer system 100. Multiple volumes may have a corresponding number of volume files, although this need not be the case in all embodiments. The above examples dealing with volume files are not the only way of handling shared file identifiers for shared file portions at the file system and file system cache level, and other above-described embodiments and those that would occur to a person of skill in the art are also suitable.

Figure 7:
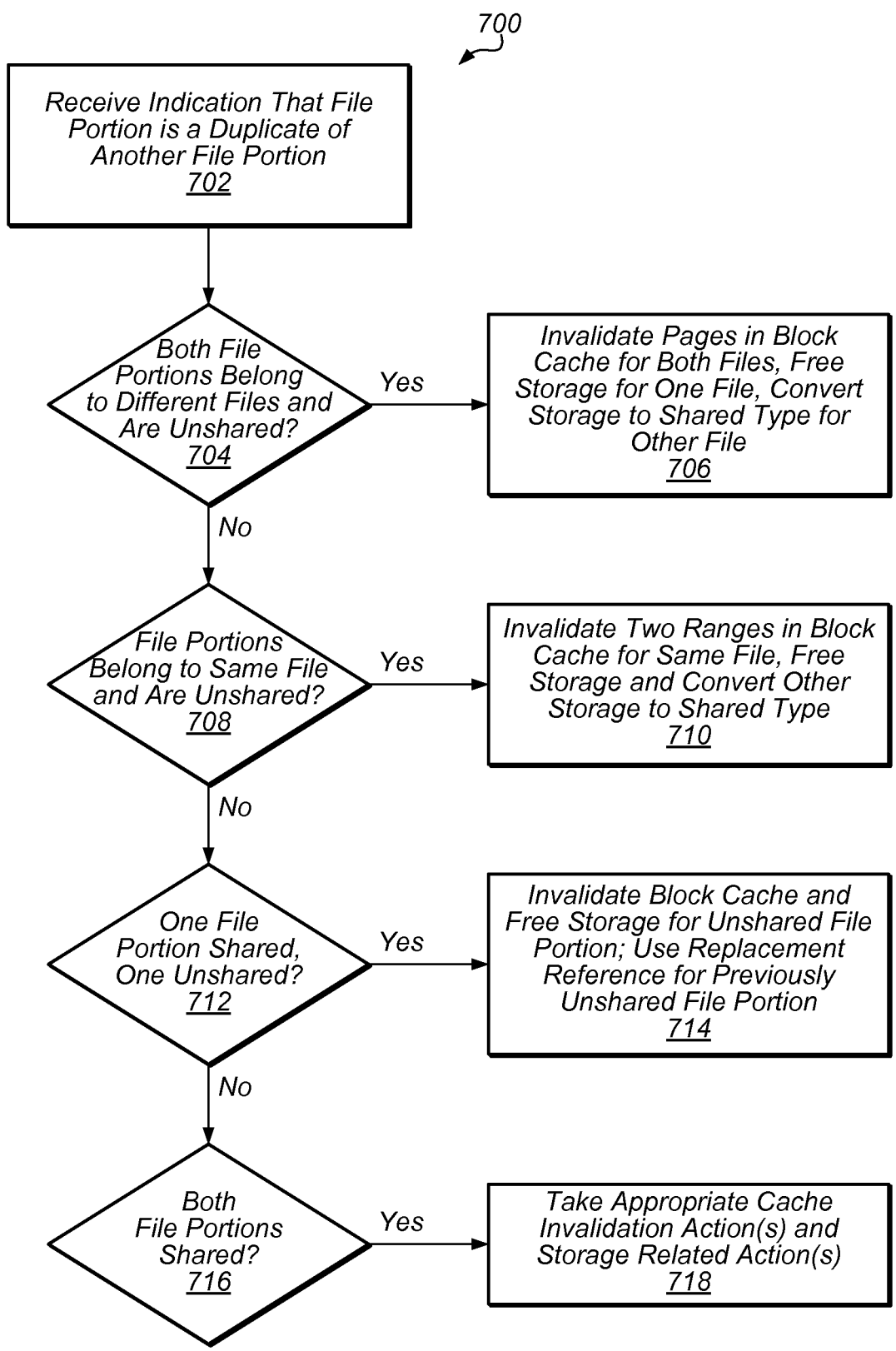
FIG. 7 is a flow diagram illustrating one embodiment of a method for managing a block cache.

Turning now to FIG. 7, a flow diagram of method 700 is shown illustrating various management options for a block cache when one file portion or extent is identified as a duplicate of another file portion or extent containing the same data. Several scenarios are illustrated in FIG. 7. Steps of method 700 may be performed variously by any combination of volume manager 150, and any or all of modules 404 and 416. Method 500 is not limited in this regard, however. Generally, method 700 is concerned with ensuring that only one valid cache entry in cache 160 exists for any given shared data block at one time. Furthermore, method 700 assumes a block cache 160 configured to store both shared an unshared data blocks.

In step 702, computer system 100 receives an indication that a first file portion (or extent) is a duplicate of a second file portion (or extent). The first file portion and/or the second file portion may or may not already be shared, and may or may not belong to the same file. In step 704, a determination is made as to whether both portions are unshared and belong to two different files. In this case, in step 706 the pages corresponding to the portions will be invalidated (e.g., from block cache 160, if previously stored) and one of the portions will be converted to a shared portion, while the other extent or file portion will be freed (e.g., from storage 170). The reference to the freed extent will be replaced by a reference to the shared extent. Any subsequent reads to the shared extent will go through the volume file in some embodiments.

In step 708, it is determined whether both file portions (or extents) are unshared and belong to the same file. In this case, in step 710 page invalidations may be made to two different ranges in the same file, and one of the extents or file portions will be converted to a shared extent, while the other one will be freed. The reference to the freed portion will be replaced by a reference to the shared portion. Any future access to the shared extent or file portion may go through the volume file in some embodiments.

In step 712, it is determined whether one of file portions or extents is already shared, while the other one is unshared. In this case, in step 714, the unshared extent and the corresponding pages in block cache 160 (or elsewhere) will be freed. The reference to the unshared extent will be replaced by the reference to the shared extent In step 716, it may be determined whether both file portions or extents are already shared. In this case, the choice of action on which file portion or extent to keep and which one to free is relevant to a deduplication design discussion and is beyond the scope of this invention description. In step 718, appropriate invalidations in block cache 160 and freeing of storage may occur for one of the (identical) shared portions, and a reference to one of the (identical) shared file portions or extents will be replaced with a reference to the surviving (shared) file portion or extent.

Figure 8:
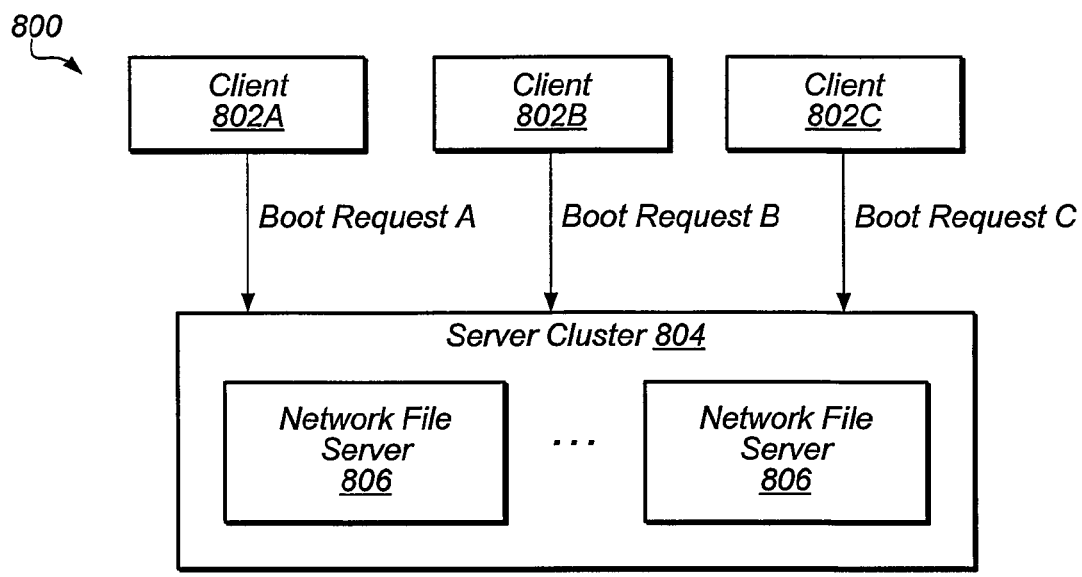
FIG. 8 illustrates an exemplary clustered file system usable to implement techniques described herein.

Turning now to FIG. 8, an exemplary environment for techniques described herein is shown. This diagram relates to the "boot storm" scenario. Individual ones of the plurality of clients 802 may be substantially similar in respects to clients 110, while individual ones of a plurality of network file servers 806 are substantially similar in respects to computer system 100. Network file servers 806 may be configured to collectively implement a server cluster for a clustered file system in this example. In some configurations, the number of clients 802 may be on the order of hundreds or thousands, but may be more or less in other configurations.

Clients 802 may make boot requests to the server cluster, which services the requests using network file servers 806. The boot requests may be for virtual machine images that are similar to each other. For example, a group of users of clients 802A-802C may all be using similar versions of the Linux operating system. Upon receiving a first boot request for a virtual machine image, the server cluster 804 may access storage 170. However, when subsequent boot requests that include shared data blocks are received, the server cluster 804 may be able to service all or part of those requests without having to go to storage 170. The solutions described herein may thus solve the boot-storm problem in a cross-platform way that can be implemented on, e.g., Linux, AIX, Solaris and HP-UX, among other operating systems. For more information on boot storms, see U.S. Pat. No. 7,415,519.

Figure 9:
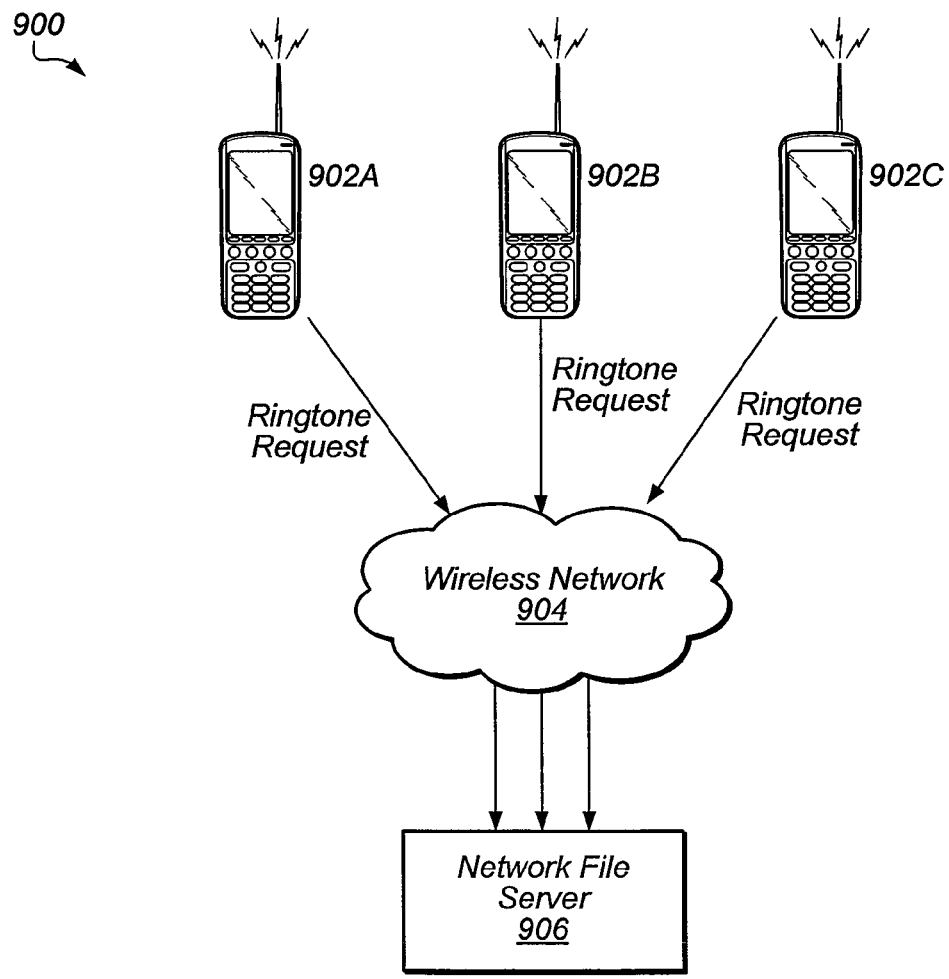
FIG. 9 shows an exemplary wireless system usable to implement techniques described herein.

Turning now to FIG. 9, another exemplary environment for techniques described herein is shown. Here, a group of mobile phones 902 may make file requests for ringtones over a wireless network. In this example, each user of a mobile phone 902 may have his or her own centrally stored profile at network file server 906 (which may be a cluster like 804, or may be a single server). There may be thousands or even millions of customer profiles in the case of a large carrier implementing this scheme. These customer profiles, however, may largely be the same. For example, each user may have a choice of one of ten default ringtones. Although each one of phones 902 may have its own remote directory storing data, network file server 906 may avoid making many disk accesses by identifying ringtone requests as including identical content, and using a block cache 160 to service all or part of the requests instead of making accesses to a storage 170. A person of skill in the art may envision many other environments with characteristics similar to those described above in FIGS. 8, 9, and elsewhere, in which the techniques described herein may be useful.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable storage medium having instructions stored thereon that are executable by a computer system to perform operations including:
   a host operating system of the computer system maintaining a cache configured to store data blocks corresponding to a plurality of different operating systems and that are shared within a file system;
   the computer system receiving first and second boot requests for first and second different boot images respectively corresponding to different first and second operating systems;
   in response to the first and second boot requests, the host operating system making a determination that the first and second different boot images respectively include a first data block and a second data block that are shared in the cache maintained by the host operating system, wherein the first and second data blocks include identical content for use by the different first and second operating systems;
   the host operating system invalidating at least one of the first data block and the second data block in the cache based on the determination;
   the host operating system associating the first data block and the second data block with a shared file identifier, wherein the shared identifier is usable by the different first and second operating systems to access the identical content;
   the host operating system receiving a first request to access one or more data blocks of a first file in the file system, wherein the first request includes a first file identifier for the first file;
   the host operating system accessing deduplication information to determine that at least the first data block is shared within the file system;
   the host operating system accessing the cache using the shared file identifier; and
   the host operating system servicing the first request.

2. The non-transitory computer-readable storage medium of claim 1, wherein said servicing the first request includes retrieving the one or more data blocks of the first file from the cache, and wherein said servicing the first request does not include the computer system accessing a storage array configured to store data blocks of the file system, wherein the storage array is indicated as storing the one or more data blocks of the first file.

3. The non-transitory computer-readable storage medium of claim 1, wherein the file system is a clustered file system, and wherein the computer system is one of a plurality of servers storing instructions configured to manage the clustered file system.

4. The non-transitory computer-readable storage medium of claim 1, wherein the operations include the host operating system maintaining one or more volume files, wherein said shared identifier specifies one of the one or more volume files.

5. The non-transitory computer-readable storage medium of claim 4, wherein each of the one or more volume files corresponds to a respective storage volume in a storage array configured to store data blocks for the file system.

6. The non-transitory computer-readable storage medium of claim 4, wherein the operations include:
   in response to a first indication that a particular data block is no longer shared by two or more files, the host operating system altering a first set of entries in the cache, wherein said altering includes invalidating at least one of the first set of entries, and wherein the first set of entries uses the shared identifier specifying one of the one or more volume files; and
   in response to a second indication that another data block is now shared by two or more files, the host operating system altering a second set of entries in the cache, wherein said altering includes invalidating at least one of the second set of entries, and wherein the second set of entries does not use identifiers specifying the one or more volume files.

7. The non-transitory computer-readable storage medium of claim 1, wherein the first and second operating systems are different versions of the same operating system.

8. The non-transitory computer-readable storage medium of claim 1, wherein the operations include:
   determining whether the first data block and the second data block belong to different operating system files.

9. The non-transitory computer-readable storage medium of claim 1, wherein the operations include:
   based on a determination that at least one of the first data block and the second data block is already shared with one or more other data blocks, associating the one or more other data blocks with the shared file identifier.

10. The non-transitory computer-readable storage medium of claim 1, wherein the operations include:
    determining whether the first data block is already shared with one or more other data blocks;
    invalidating the second data block in the cache and not the first data block in response to determining that the first data block is already shared with the one or more other data blocks.

11. A method, comprising:
    a computer system receiving first and second boot requests for first and second different boot images respectively corresponding to different first and second operating systems, wherein the computer system includes a processor and a memory;
    in response to the first and second boot requests, the computer system making a determination that a first data block of a first file corresponding to the first boot image is shared with a second data block corresponding to the second boot image, wherein the second data block is in a cache maintained by a host operating system of the computer system, wherein the cache stores data blocks corresponding to a plurality of different operating systems, and wherein the first and second data blocks include identical content for use by the different first and second operating systems;

the computer system invalidating at least one of the first data block and the second data block in the cache based on the determination;

the computer system associating the first data block and the second data block with a shared file identifier;

the computer system servicing the first and second boot requests, including accessing the cache using the shared file identifier; and upon determining that the cache includes at least one file portion needed to service the first boot request but does not include at least one or more other file portions needed to service the first boot request, the computer system retrieving the one or more other file portions from one or more storage devices coupled to the computer system;

wherein the cache is implemented in a memory of the computer system other than the one or more storage devices.

12. The method of claim 11, wherein the computer system is a networked file server, and wherein a file system including the first file is a clustered file system.

13. The method of claim 11, wherein the first and second boot images are different versions of a same operating system.

14. The method of claim 11, wherein said servicing the first boot request includes providing one or more shared file portions to a first user; and wherein the method further comprises providing the one or more shared file portions to a plurality of other users in response to a plurality of other boot requests.

15. A system, comprising:
a clustered file system, comprising:
a plurality of computer servers configured to service file requests; and
a plurality of storage devices coupled to the plurality of computer servers via one or more interfaces, wherein the plurality of storage devices are configured to store files of the clustered file system, including files corresponding to a plurality of different operating systems;

wherein one or more individual ones of the plurality of computer servers respectively include caches configured to store data blocks; and wherein individual ones of the plurality of computer servers are configured to:
receive first and second boot requests for first and second different boot images respectively corresponding to different first and second operating systems;
make a determination that the first and second different boot images respectively include a first data block and a second data block in a respective cache, wherein the first and second data blocks include identical content for use by the different first and second operating systems;
invalidate at least one of the first data block and the second data block based on the determination; and
associate the first data block and the second data block with a shared file identifier, wherein the shared identifier is usable by the different first and second operating systems to access the identical content; and wherein for a given file access request specifying a given file identity, individual ones of the plurality of computer servers are configured to service the given file access request by:
accessing deduplication information to determine whether at least one data block needed to satisfy the given file access request is shared;
based on the accessed deduplication information, determining a particular shared file identifier corresponding to the at least one data block; and
servicing the given file access request using the particular shared file identifier:
wherein said servicing the given file access request includes one or more of the plurality of computer servers using at least one cache to provide the at least one data block without accessing a copy of the at least one data block stored in the plurality of storage devices.

16. The system of claim 15, wherein the plurality of storage devices and the one or more interfaces comprise a storage area network (SAN).

17. The system of claim 15, wherein the clustered file system includes stored instructions executable to run a deduplication process that generates the deduplication information.

* * * * *